Nov. 11, 1924.
W. A. DARRAH
1,514,835
APPARATUS FOR TREATING AIR AND OTHER GASES
Original Filed July 29, 1922  2 Sheets-Sheet 1
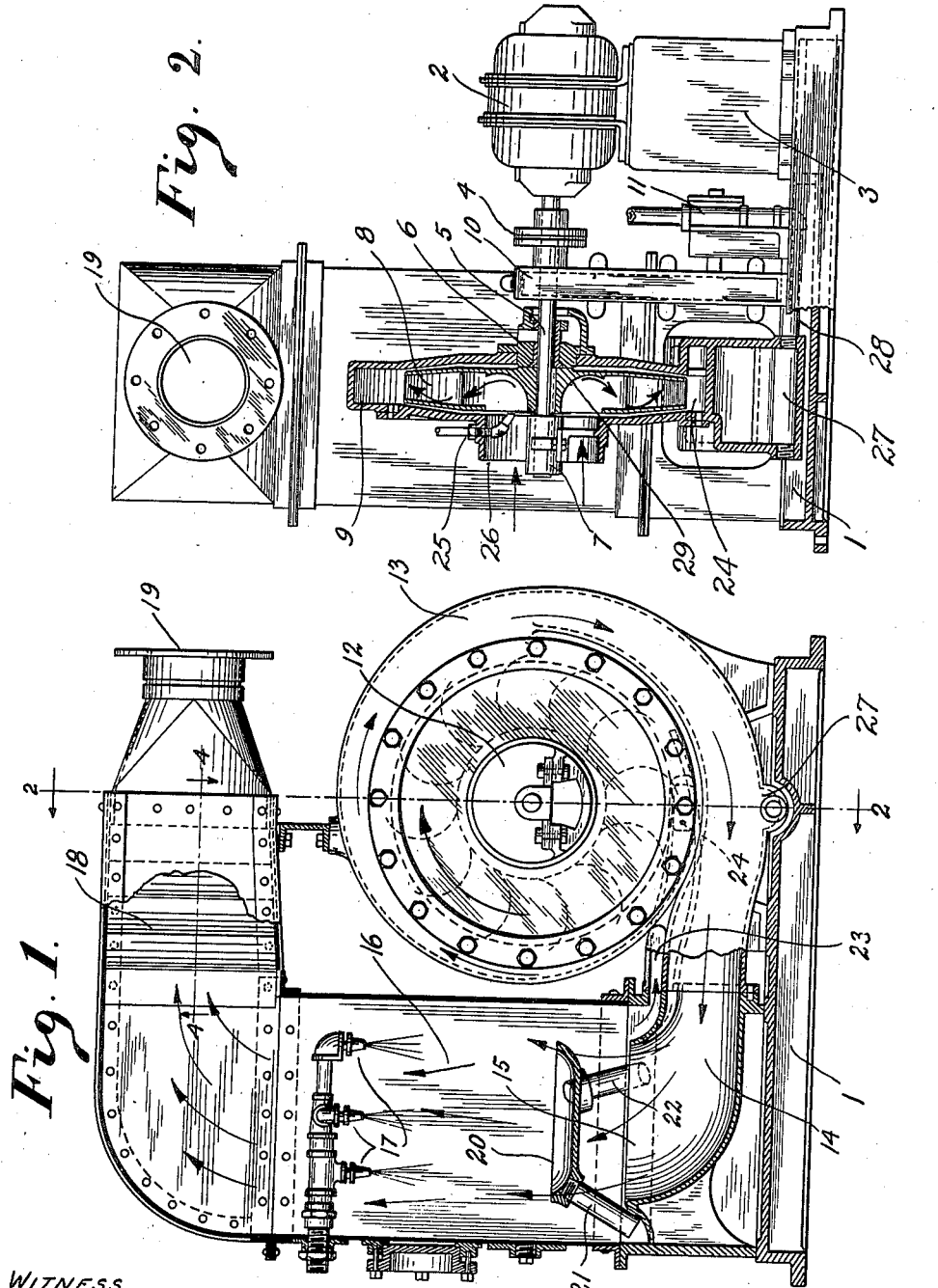

Nov. 11, 1924.  
W. A. DARRAH  
1,514,835  
APPARATUS FOR TREATING AIR AND OTHER GASES  
Original Filed July 29, 1922   2 Sheets-Sheet 2
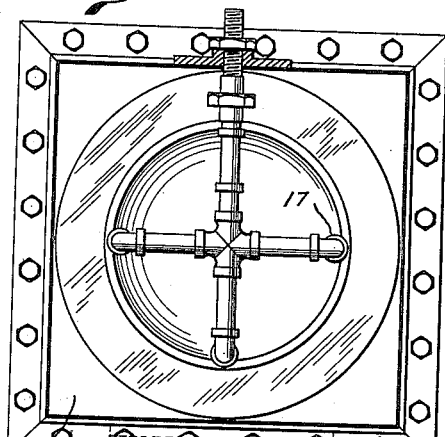
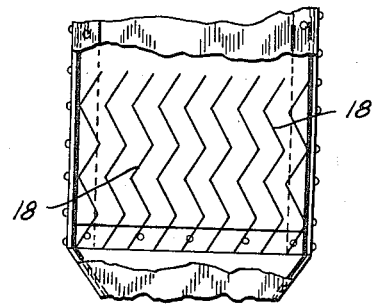
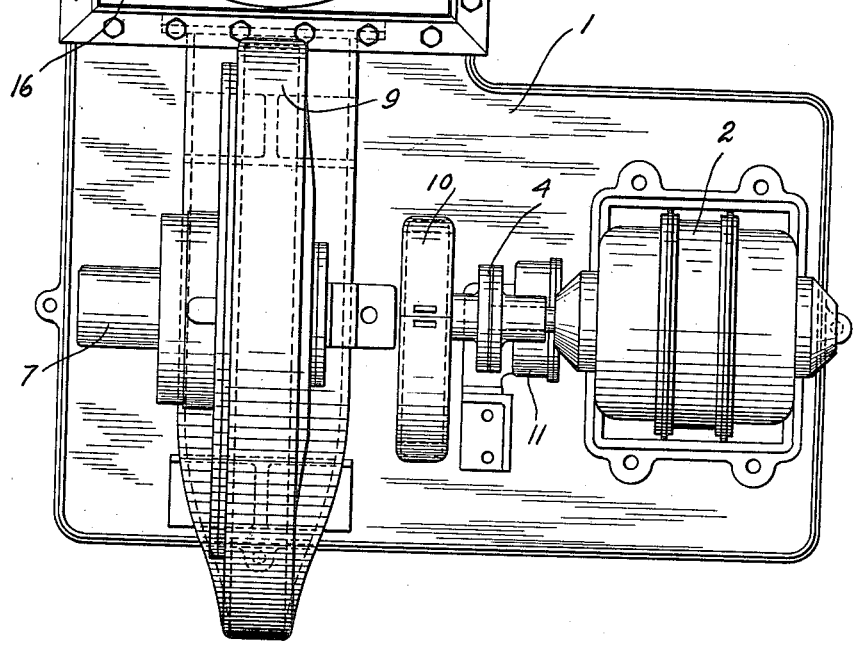

Patented Nov. 11, 1924.

1,514,835

UNITED STATES PATENT OFFICE.

WILLIAM A. DARRAH, OF CHICAGO, ILLINOIS.

APPARATUS FOR TREATING AIR AND OTHER GASES.

Substitute for application Serial No. 578,516, filed July 29, 1922. This application filed June 7, 1924.
Serial No. 719,195.

*To all whom it may concern:*

Be it known that I, WILLIAM A. DARRAH, a citizen of the United States, residing at Chicago, in the county of Cook and State of Illinois, have invented a new and useful Improvement in Apparatus for Treating Air and Other Gases, of which the following is the specifications.

This invention relates to equipment and methods for treating air and other gases. The equipment is particularly applicable to cooling and washing air which is required in the manufacture of bread, other food products, and for such applications as require clean, dry, cool air, substantially free from bacteria and other organisms.

Some of the objects of this invention are to secure a high efficiency of cooling and washing the air with the use of a relatively small amount of water or brine. Another object is to use the water or brine effectively, so that the greatest amount of cooling will be accomplished with the minimum amount of cooling material.

Other objects of this invention are to provide an equipment which will consume comparatively little power, which will be relatively inexpensive in proportion to the work done, and which will be rugged, accessible, and durable. It is also desired to provide equipment which will deliver air in a form which is free from drops of entrained moisture or other liquids. If desired, I may apply this equipment to the treatment of other gases than air, the operation being substantially identical.

One of the particular applications of this invention is in connection with various applications relating to the manufacture of bread and the introduction of cold, clean air into the dough.

Referring to the drawings, Figure 1 shows a side elevation partly in section, of this equipment, while Figure 2 shows a longitudinal elevation also partly in section. Figure 3 shows a plan view of this equipment. Fig. 4 shows a detail of the baffles.

Referring to the drawings, (1) represents a base which may be of cast iron or any other desired material. A motor (2) is mounted upon an extension (3) of base (1). Motor (2) is connected by flexible drive (4) to shaft (5) which runs in bearings (6) and (7). Rotating blade member (8) is keyed upon shaft (5) and rotates in housing (9) which is also mounted on base (1). A chain drive (10) connects shaft (5) with pump (11) which serves to keep the cooling liquid in circulation.

Rotating blade member (8) which is mounted on shaft (5) draws in air or other gases through opening (12) to the shaft (5). The air acted upon by centrifugal forces passes radially outward through blade member (8) into spiral channel (13). The air then travels circumferentially around spiral duct (13), leaving by outlet (14). The air then enters the tank casting (15), which for mechanical purposes may be to advantage mounted upon base (1). From tank casting (15) the air passes upward and into spray chamber (16) in which are located spraying nozzles (17). After leaving spray chamber (16) the air passes through deflecting baffles (18) to outlet (19), from whence it is delivered to whatever source may require it. Collecting cup (20) is located in the lower portion of spray chamber (16), and serves to collect the moisture which falls from spray member (17) downward. Moisture collected in cup (20) passes through hollow legs (21), (22), etc., into channel (23), from whence it is led into box (24) of lower shell.

The water which passes through channel (23) into box (24) of the lower shell collects until a level is reached in shell (24) such that the rotating blade member (8) strikes it. When struck by blade member (8) the water is immediately divided into a very fine spray and travels circumferentially through spiral duct (13), being carried by the rotation of member (8). During this period the finely divided water is intimately mixed with the air which enters housing (9) at inlet (26). This preliminary mixing serves to give the air a preliminary washing and cooling, using the water or brine which has already given the air its final washing and cooling.

The spray which travels through spiral duct (13) and serves to wash and cool the air driven by blade (8) is largely collected in the lower portion (27) of housing (13). The water which collects in the lower portion (27) of housing (13), is connected by outlet pipe (28) to pump member (11), which may return the water to the cooling tank or discharge it to the drain, according to commercial conditions. A portion of the fine spray in the air will pass with the air currents through outlet casting (14) into spray chamber (16), and will be entirely removed from the air in passing through baffles (18). These baffles are shown in side elevation in Figure 1, and a detail plan view partly in section is shown in Figure 4.

Pipe member 25 is provided in air inlet (26) to permit the direct addition of water to rotating member (8). The hub portion (29) of rotating member (8) is given a curved shape to deflect the water added through pipe (25). The curved shape of hub member (29) together with the effect of centrifugal force, serves to deflect the spray toward the periphery of member (8) in such a manner that it strikes the housing of rotating member (28) several times. This serves to produce an extremely fine spray which causes the water to expose a much greater surface to the air, thus more effectively cooling and washing the air.

Referring to the method of operating this equipment, it will be evident that this invention makes use of what may be called a counter current method of employing water or brine to cool and wash the air. As far as I am aware, it is customary in air treating equipment to submit the spray of liquid to the air only once, after which the liquid is collected, subjected to a further cooling, and recirculated or new liquid added. In the device which comprises my invention, however, the cold, clean liquid is used to cool and wash the air immediately before it leaves the device, while the liquid which is collected from this operation is then passed into the blower and serves to give the entering air a preliminary cooling and washing.

This system not only results in a decided economy in the use of the cooling liquid, but also requires a lesser temperature difference between the entering liquid and the entering air to produce a given final result. Also, because of the greater contact between the air and the liquid, a more compact equipment may be employed.

In some cases it has been found satisfactory to omit the use of spray members (17), thereby saving materially in equipment and size of apparatus.

In certain cases, on the other hand, it is expedient to use the blower member merely to circulate the air and permit the spray member to do the major part of the cooling and washing.

It will be understood that while this device has been described for use in cooling and washing air it may be applied to cooling and warming air by merely employing a warm liquid instead of a cold liquid. It will be further understood that this device may be used with any suitable liquid. Water is probably the most satisfactory liquid for the average purpose, but brine may be used with equal satisfaction, or in certain cases oils or liquids which do not mix with water may be employed. One advantage in the use of a liquid which does not mix with water is the fact that if the liquid is maintained very cold, water which may condense into the liquid can be readily separated by running the two materials into a tank and allowing them to settle.

It will be further understood that while the drawing and specification shows certain forms of mechanism capable of producing a given result, yet I do not wish to restrict my invention to the exact construction or operation shown and described, as many modifications are possible and still come within the scope of this invention.

I claim:

1. The process of treating air, which consists in blowing said air through a spray chamber, washing said air in said spray chamber with a liquid spray, collecting the liquid spray after washing said air, and directing said collected spray into the blower member for preliminary treatment of said air.

2. An apparatus for treating air, which consists of a blower, a spray chamber connected thereto, a baffle member adjacent to said spray chamber, means for introducing liquid into said spray chamber, means for carrying the used spray liquid into said fan member, means for atomizing said spray in said fan member, and a trap member for collecting said spray from said fan member.

3. An apparatus for treating air, consisting of a spray chamber, a spray nozzle for producing a fine spray in said chamber, a fan member delivering air to said spray chamber, means for collecting the spray in said chamber, a passage communicating between said spray chamber and said fan for delivering said collected spray to said fan.

WILLIAM A. DARRAH.